Oct. 28, 1952     J. M. SIMPSON ET AL     2,615,346

TRANSMISSION

Filed Oct. 29, 1945     4 Sheets-Sheet 1

Inventors:
John M. Simpson and
Donald W. Kelbel
By Edward C. Fritzbaugh
Atty.

Oct. 28, 1952   J. M. SIMPSON ET AL   2,615,346
TRANSMISSION
Filed Oct. 29, 1945   4 Sheets-Sheet 4

Inventors:
John M. Simpson and
Donald W. Kelbel
By Edward C. Fritzbaugh
Atty.

Patented Oct. 28, 1952

2,615,346

UNITED STATES PATENT OFFICE 2,615,346

TRANSMISSION

John M. Simpson, Miami Beach, Fla., and Donald W. Kelbel, Muncie, Ind., assignors to Borg-Warner Corporation, Chicago, Ill., a corporation of Illinois Application October 29, 1945, Serial No. 625,316

13 Claims. (Cl. 74—375)

Our invention relates to transmissions particularly for automotive vehicles, and more particularly our invention relates to shifting mechanism for such transmissions.

Manual transmission shifting mechanism has heretofore often comprised a plurality of shift rails slidably disposed in the transmission casing above the transmission gearing. A shift lever extending upwardly and pivoted to the casing above the rails was provided for engaging with the rails to shift them and thus change the speed ratio through the transmission. Such an arrangement, however, was not very compact since both the shift lever and rails were above the gearing. It is an object of our invention to more compactly arrange the manual shift lever for a transmission and the shift rails, and to this end it is an object to provide an improved arrangement in which the shift rails are at the side of the gearing and the shift lever is above the shift rails. In particular we contemplate that the transmission shall have more than two of such shift rails and that the shift lever shall simply be movable transversely of the transmission to engage with any of the shift rails preliminary to shifting them.

Transmissions are ordinarily provided with positive clutches and with synchronizing means for synchronizing the speed of the parts of the positive clutches prior to their engagement. The synchronizing means generally requires a force which is greater in proportion to the speed to which one of the clutch parts is to be raised and in general it is thus necessary to apply greater force to the synchronizing means for the low speed positive clutches than for the high speed positive clutches in making a shift from a higher speed ratio to a lower speed ratio. It is thus an object of our invention to dispose the shift rail for the lowest speed provided in the transmission closer to the pivot of the shift lever than a shift rail for higher speeds provided by the transmission.

It is another object of our invention to provide an improved shifting arrangement in which a shifter shaft carrying a shift arm and journaled in the transmission casing and extending longitudinally thereof may be substituted for the upwardly extending shift lever. To this end it is an object of the invention to provide reciprocable shift rails provided with slots which are circularly disposed about the journal openings in the transmission casing for the swingable shaft and arm whereby the slots may receive said arm for shifting the rails.

It is a further object of our invention to provide a novel transmission casing for the gear change mechanism above described and adapted to permit the alternate installation of the two described types of improved shifting arrangements.

A still further object of our invention is to provide a novel transmission casing for the gear change mechanism above described having means including a socket for pivotally mounting a shift lever above the shift rails, and other means including oppositely disposed journal openings in opposite sides thereof for pivotally mounting a shaft extending through the openings and having a shifter arm, said means disposing the shift lever and shifter arm in such relationship to the shift rails that the shifter lever or the shifter arm may selectively engage any of the rails when the shift lever and the shaft are alternately installed in the casing.

The invention consists of the novel constructions, arrangements and devices to be hereinafter described and claimed for carrying out the above stated objects and such other objects as will appear from the following description of certain preferred embodiments illustrated in the accompanying drawings, wherein:

Like characters of reference designate like parts in the several views.

Referring now to Figs. 1 to 5 of the drawings, the illustrated transmission may be seen to comprise an input shaft 10, an output shaft 11 and a countershaft 12. These shafts are all mounted within a transmission casing 13 and extend longitudinally thereof and the shafts 10 and 11 are rotatably disposed in the casing. A gear 14 is fixed on the shaft 10, and gears 15, 16 and 17 are rotatably disposed on the shaft 11. A gear 18 is splined on the shaft 11, as shown.

A cluster gear 19 is rotatably disposed on the countershaft 12, and this gear comprises the gears 20, 21, 22 and 23, as shown. As will be noted from Fig. 1, the gears 14, 15, 16 and 17 are respectively in mesh with the gears 20, 21, 22 and 23. An idler gear 24 is rotatably fixed to the transmission casing 13, and the gear 24 is also in mesh with the gear 23. The gear 18 is adapted to be moved longitudinally of the shaft 11 into mesh with the gear 24 for completing a power train between the gears 23 and 18.

Figures 1, 4, 5:
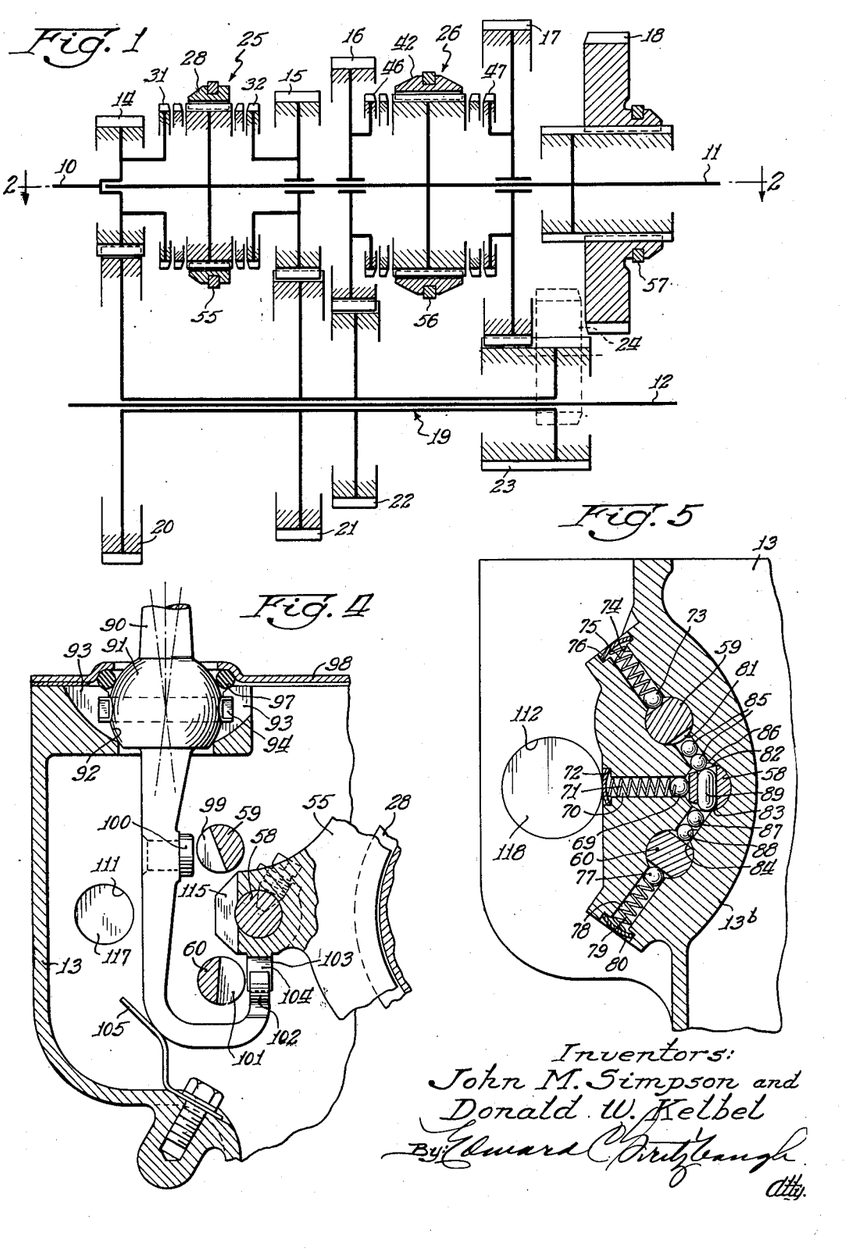
Fig. 1 is a longitudinal sectional view drawn diagrammatically of a transmission with which our improved shifting mechanism may be used.
Figs. 4 and 5 are sectional views taken on lines 4—4 and 5—5 respectively of Fig. 3.
Figure 2:
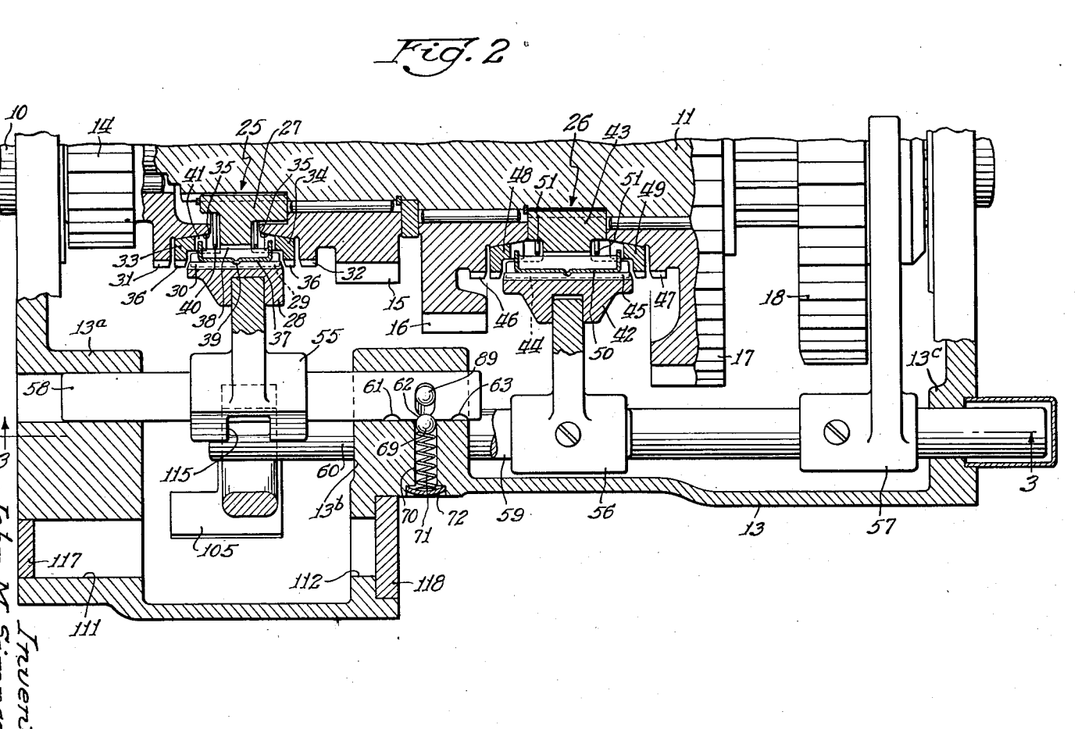
Fig. 2 is a sectional view of the transmission which is taken on lines 2—2 of Figs. 1 and 3.
Figure 3:
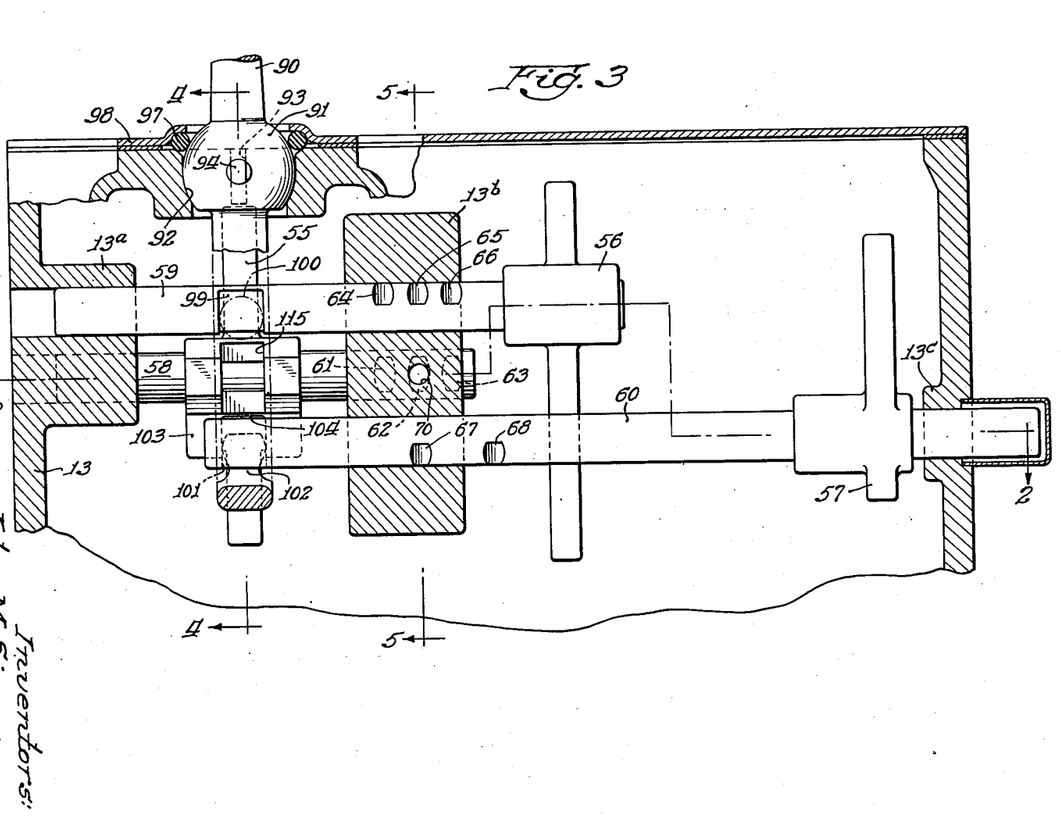
Fig. 3 is a sectional view taken on line 3—3 of Fig. 2.

Positive clutch mechanism 25 is provided for connecting either the gear 14 or the gear 15 with the driven shaft 11, and positive clutch mechanism 26 is provided for connecting either the gear 16 or the gear 17 with the driven shaft 11. The clutch mechanism 25 comprises a hub 27 fixed to the shaft 11 and a collar 28 slidably disposed on the hub. The hub 27 is provided with teeth 29 on its periphery which are in mesh with teeth 30 formed on the internal surface of the collar 28. Teeth 31 and 32 are provided respectively on the gears 14 and 15, and the collar 28 is movable from its neutral position in which it is shown in the drawings either to bring its teeth 30 into mesh with the teeth 31 in one position or to bring its teeth 30 into mesh with the teeth 32 in another position. In the former position, the engaging teeth 30 and 31 function to connect the shafts 10 and 11 through the collar 28 and hub 27 and in the latter position the teeth 30 and 32 function to connect the gear 15 with the shaft 11 also through the collar and hub.

A blocker synchronizing ring 33 is provided between the hub 27 and teeth 31, and a similar ring 34 is provided between the hub and the teeth 32. These rings are adapted to bear on friction surfaces 35 provided on the shaft 10 and on the gear 15 adjacent the hub 27, as shown. The rings 33 and 34 each are provided with blocker teeth 36 which function to block the movement of the teeth 30 and the collar 28 when the teeth 36 are in the path of movement of the teeth 30. The synchronizing rings 33 and 34 are acted on by thrust bars 37 disposed in suitable slots 38 in the periphery of the hub 27. Each of the thrust bars is provided with a projection 39 which fits in a suitable internal groove in the collar 28 in the neutral condition of the clutch mechanism in which it is illustrated, and springs 40 acting on the thrust bars 37 yieldably hold the thrust bars with their projections within this groove. Each of the rings 33 and 34 is provided with a slot 41 receiving an end of a thrust bar 37, and the slots are of such width that the synchronizer ring may have a limited rotary movement with respect to the thrust bars. At the limit of the movement between one of the synchronizer rings and the thrust bars, the teeth 36 on the ring function to block movement of the collar 28 toward an engaged position. The synchronizer rings 33 and 34 function due to their frictional contact with the tapered surfaces 35 to synchronize the speed between the collar 28 and either the shaft 10 or the gear 15 prior to engagement of the collar either with the teeth 31 or teeth 32. The thrust bars 37 function to transmit force from the collar 28 to either of the rings 33 or 34 to provide the synchronizing force between either of the rings and the corresponding tapered surface 35. The teeth 36 on each of the rings function to prevent a complete movement of the collar 28 to engaged position until the speed of the teeth to be engaged are synchronized with the collar and there is a slight reversal of relative rotation whereby the synchronizer ring and its teeth 36 are rotated slightly to move the teeth 36 out of the path of movement of the teeth 30 of the collar 28. The projections 39 of the thrust members 37 are moved out of the internal groove in the collar 28 against the action of the springs 40 when the collar 28 moves into either of its fully engaged positions. As is apparent from an inspection of the construction, the force exerted on the rings 33 and 34 from the collar 28 for synchronizing the engaging parts of positive clutch is transmitted through the projections 39, and when these projections move out of the internal groove in the collar 28, the thrust bars do not thereafter exert synchronizing force on the snychronizer rings. The construction and operation of the clutch mechanism 25 is believed clear from the above explanation; however, the patent to S. O. White et al., No. 2,221,900, issued November 19, 1940, may be referred to for a more full description of the synchronizer and blocker clutch mechanism.

The clutch mechanism 26 is very similar in construction and operation to the clutch mechanism 25. The clutch mechanism 26 comprises a collar 42 slidably disposed on the periphery of a hub 43 which is fixed to the shaft 11. The hub 43 is provided with teeth 44 on its periphery and the collar 42 is provided with teeth 45 within the collar which are in mesh with the teeth 44. Clutch teeth 46 and 47 are provided respectively on the gears 16 and 17, and the collar 42 is adapted to mesh with either set of teeth to respectively connect the gear 16 with the driven shaft 11 or the gear 17 with the shaft. Blocker synchronizing rings 48 and 49 are provided between the hub 43 and the gears 16 and 17, and these synchronizing rings are acted on by thrust bars 50 which are in turn acted on by springs 51. The parts in the clutch mechanism 26 corresponding to those in the clutch mechanism 25 operate in a similar manner, and the rings 48 and 49 function to synchronize the parts of the clutch mechanism 26 to be engaged and to prevent such engagement prior to such synchronization, similar to the manner of operation of the rings 33 and 34 in the clutch mechanism 25.

Four speeds in forward drive and a single speed in reverse drive are provided by the illustrated transmission. Low speed forward drive is provided by moving the collar 42 into mesh with the teeth 47 to thereby connect the gear 17 with the shaft 11. The drive is then from the drive shaft 10 through the gears 14 and 20 to the countershaft gear cluster 19 and through the gears 23 and 17 and the clutch mechanism 26 to the driven shaft 11. Second speed in forward drive is provided by moving the clutch collar 42 to engage it with the teeth 46 to thereby connect the gear 16 with the driven shaft 11. The power train in second speed is the same as in first speed with the exception that the drive proceeds through the gears 22 and 16 in lieu of the gears 23 and 17. Third speed in forward drive is provided by moving the clutch collar 28 to engage it with the teeth 32, with the clutch mechanism 26 being disengaged. The drive in third speed forward is from the shaft 10 and through the gears 14 and 20, the countershaft gear cluster 19 and the gears 21 and 15 and clutch mechanism 25 to the driven shaft 11. Fourth speed forward which constitutes a direct drive between the shafts 10 and 11 is completed by moving the clutch collar 28 into engagement with the teeth 31. Reverse drive is obtained with the clutch mechanisms 25 and 26 both in neutral condition and with the gear 18 being moved on the shaft 11 to bring it into mesh with the idler gear 24. In reverse drive, the power train proceeds from the drive shaft 10 through the gears 14 and 20, the countershaft gear cluster 19 and the gears 23, 24 and 18 to the driven shaft 11.

The mechanism for shifting the clutch sleeves 28 and 42 and the gear 18 for conditioning the transmission for the various speed ratios will now be described. Yokes 55, 56 and 57 are provided which fit respectively in suitable grooves formed in the sleeves 28 and 42 and in the gear 18, so that the yokes may shift these parts. The yokes 55, 56 and 57 are respectively fixed to shafts 58, 59 and 60, and these shafts are slidably disposed in the casing 13. The shafts 58 and 59 extend through casing portions 13a and 13b, and the shaft 60 extends through the casing portions 13b and 13c (see Fig. 3).

Ball locking and detent means are provided for controlling the motion of the shafts 58, 59 and 60. The shaft 58 is provided with three notches 61, 62 and 63; the shaft 59 is provided with three notches 64, 65 and 66; and the shaft 60 is provided with two notches 67 and 68 (see Fig. 3). The notches 61, 62 and 63 are adapted to cooperate with a ball 69 slidably disposed in a cylindrical cavity 70 provided in the casing portion 13b. The ball 69 is acted on by a spring 71 also disposed in the cavity 70 and held in place by a cap 72. The notches 64, 65 and 66 are adapted to cooperate with a ball 73 which is disposed in another cavity 74 in the casing portion 13b and which is acted on by a spring 75 held in place by a cap 76. A ball 77 is provided for cooperating with the notches 67 and 68, and the ball 77 is disposed in another cylindrical cavity 78 in the casing portion 13b. The ball 77 is acted on by a spring 79 held in place by a cap 80. The balls 69, 73 and 77 all act similarly with respect to their respective notches in the shafts 58, 59 and 60 and function as detent means for yieldably holding the shafts in a number of different positions.

The notches 63, 62 and 61 are so disposed on the shaft 58 that the ball 69 when in the notches functions to yieldably hold the clutch sleeve 28 respectively in its direct drive position wherein the sleeve engages the teeth 31, in neutral position in which the sleeve is illustrated or in third speed position in which the sleeve engages the teeth 32. The notches 66, 65 and 64 are so disposed on the shaft 59 that the ball 73 when in the notches functions to yieldably hold the clutch sleeve 42 respectively in its second speed position in which the sleeve is in engagement with the teeth 46, in neutral position in which the sleeve is illustrated, or in the low speed position of the sleeve in which it is engaged with the teeth 47. The notches 67 and 68 are so disposed in the shaft 60 that the ball 77 when in the notches functions respectively to yieldingly hold the gear 18 either in its neutral position in which it is illustrated or in its reverse position in which it is engaged with the gear 24.

The mechanism for locking the rails 58, 59 and 60 against movement under certain conditions comprises a notch 81 formed in the rail 59; notches 82 and 83 formed in the rail 58 and a notch 84 formed in the rail 60. Balls 85 are provided in a cylindrical cavity 86 extending between the notches 81 and 82, and balls 87 are provided in a cylindrical cavity 88 extending between the notches 83 and 84. A bead-like element 89 is slidably disposed in the rail 58 and extends between the slots 82 and 83.

It will be noted that, in the drawings, the rails 58, 59 and 60 are illustrated in their neutral positions, and the notches 81, 82, 83 and 84 are all in line with each other and with the balls 85 and 87 in these positions of the rails. The balls 85 and 87 and the bead 89 function to prevent a movement of two of the rails out of their neutral positions when a third rail is moved out of neutral position. This locking mechanism thus functions to prevent a conditioning of the transmission into more than one speed ratio at a time. When the rail 59 is moved out of its neutral position, it holds the uppermost of the balls 85 in its illustrated position so that the lowermost ball 85 is in the notch 82 in the rail 58 and prevents the movement of the latter rail. The lowermost ball 85 also bears on the bead 89 which bears against the uppermost of the balls 87 and holds the lowermost ball 87 in the notch 84 in the rail 60. The latter rail is thus held from movement also. When the rail 60 is moved out of its neutral position with the other two rails being in their neutral positions, the balls 87 and 85 and the bead 89 function in a similar manner to hold the rails 59 and 58 in their neutral positions as will be readily understood. When the rail 58 is moved out of neutral position with the other two rails being in their neutral positions, the balls 87 are held by the rail in their illustrated positions and the balls 85 are moved upwardly out of the notch 82 and are held in their upward positions with the uppermost ball 85 being within notch 81 of the rail 59. The balls thus hold the two rails 59 and 60 in their neutral positions when the rail 58 is out of neutral position.

A shift lever 90 is provided for shifting the rails 58, 59 and 60. The lever 90 is provided with a ball portion 91 which is disposed in a socket 92 provided in the transmission casing 13, and the shift lever is thus pivoted in the transmission casing 13. The casing 13 is provided with opposite slots 93 opening into the socket, and the ball portion 91 is provided with a key 94 extending therethrough and into the slots 93. The key 94 effectively prevents a rotation of the lever 90 within the socket 92 as will be understood. The lever 90 is held in place by means of an annular gasket 97 which is disposed between the ball portion 91 and a cover 98 for the transmission casing.

The shift rail 59 is provided with a slot 99 therein, and a pin 100 is provided in the lever 90, the pin being adapted to enter the slot 99 when the lever 90 is rotated in a counter clockwise direction about its ball and socket connection with the casing 13 as seen in Fig. 4. The shift rail 60 is provided with a slot 101 and the lever 90 is provided with a return bent upwardly extending tang portion 102 which is adapted to enter the slot 101 when the lever 90 is rotated in a clockwise direction as seen in Fig. 4 about its ball and socket joint with the casing 13. The yoke 55 on the shaft 58 is provided with a downwardly extending projection 103 in which a slot 104 is formed. The tank portion 102 is adapted to enter the slot 104 when the lever 90 is in a vertical position, in which the lever is shown in Fig. 4, for shifting the yoke 55 and the rail 58.

The rails 58, 59 and 60 may be shifted by means of the single lever 90. If the lever 90 is allowed to remain with its tang portion 102 in engagement with the slot 104 and the upper end of the lever 90 is moved longitudinally of the transmission the lever will shift the yoke 55 and thereby the clutch mechanism 25 either into its third or fourth speed condition. The lever 90 when rotated in the clockwise direction as seen in Fig. 4, will have its tang portion 102 enter the slot 101 in the rail 60, and the lever 90 by movement longitudinally of the transmission may be utilized to shift the gear 18 into its position providing a reverse power train through the transmission. The pin 100 on the lever 90 may be engaged with the rail 59 by a counterclockwise movement of the lever from its position as shown in Fig. 4, and the lever 90 by a movement longitudinally of the transmission may then be utilized to shift the rail 59 and thereby the clutch sleeve 42 of the clutch mechanism 26 to put the sleeve either into its first or second speed position. It will be noted that the rail 59 is closest to the ball and socket connection of the lever 90 with the casing 13, and with the same force exerted on the upper end (not shown) of the lever 90, a greater force may be exerted on the rail 59 than on either of the other two rails 58 and 60. This is advantageous, due to the fact that, particularly in downshifting, a greater force is necessary to synchronize the parts to be coupled with the clutch sleeve 42 than is necessary in connection with the clutch sleeve 28 of the clutch mechanism 25.

A spring 105 may be provided fixed to the transmission casing 13, as shown in Fig. 4. This spring bears on the lower end of the lever 90 and yieldingly holds the lever out of engagement with the reverse rail 60.

In order to disassemble the lever 90 from the transmission, the reverse rail 60, the cover 98 and the gasket 97 are removed from the rest of the transmission. The lever 90 is then lifted slightly to remove the key 94 from the slots 93, and the lever is rotated through 180° about its vertical axis so that the return bent lower portion of the lever extends longitudinally of the transmission. The lever 90 may then be pulled out of the transmission casing, leaning the lever horizontally as its return bent lower portion is moved through the socket 92.

Figure 6:
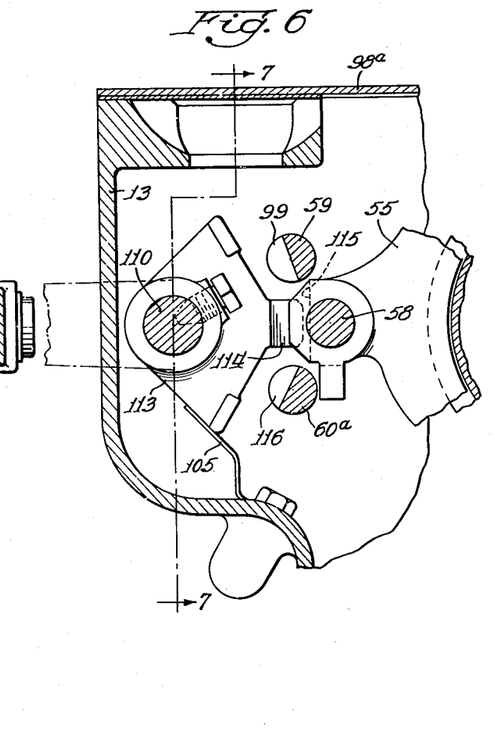
Fig. 6 is a sectional view through the transmission corresponding to Fig. 4 but with a different type of shift mechanism substituted for the upwardly extending shift lever shown in Fig. 4.
Figure 7:
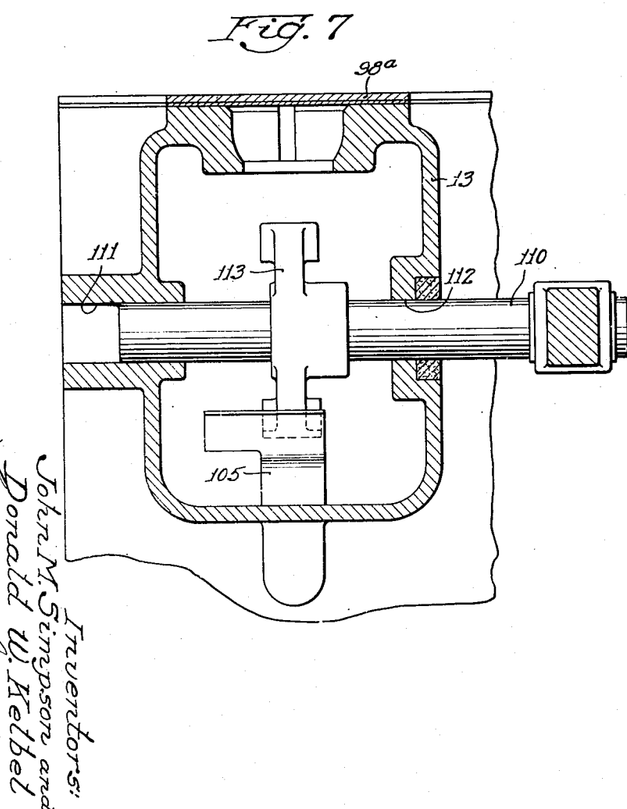
Fig. 7 is a sectional view taken on line 7—7 of Fig. 6.

An alternate shifting mechanism may be used for shifting the shift yokes 55, 56 and 57 in lieu of the hand operated lever 90. This alternate shifting mechanism is illustrated in Figs. 6 and 7 and is one that is particularly adaptable for power shifting the transmission by suitable power operators or may be used in connection with a remote manually operated shifting lever (not shown) located immediately below the steering wheel of the automotive vehicle. Referring to Figs. 6 and 7, the alternate shifting mechanism comprises a shaft 110 which extends through openings 111 and 112 in the transmission casing 13 and is thereby slidably and rotatably disposed within the casing 13. The shaft 110 carries a shift arm 113 provided with a tang portion 114. The yoke 55 is provided with a slot 115 therein, and the shift arm 113 when rotated is adapted to fit into either the slot 115 or into the slot 99 of the first and the second speed shift rail 59. A reverse shift rail 60a is used in connection with this shifting mechanism and is the same as the shift rail 60 with the exception that a slot 116 is provided in this rail in lieu of the slot 101. The slot 116 is disposed substantially at the same distance from the center of the shaft 110 as are the slots 115 and 99, and the rail 60a may be shifted by moving the tang portion 114 into the slot 116. As is apparent, after the shift arm 113 has been moved to engage in any of the slots 99, 115 or 116, the corresponding shift rail may be moved simply by giving a longitudinal movement to the shaft 110. The spring 105 if used functions with the shift arrangement shown in Figs. 6 and 7 to yieldingly hold the shift arm 113 out of engagement with the reverse rail 60a.

When the shifting mechanism shown in Figs. 6 and 7 is used, a closure plate 98a for the transmission casing 13 may be used which plate completely closes the socket opening for the ball portion 91 of the shaft lever 90. Referring again to Figs. 2, 3 and 4, the openings 111 and 112 may be closed by closure members 117 and 118 when the lever 90 is used to shift the transmission, as shown.

Our improved shifting mechanism for transmissions advantageously provides two alternate arrangements which may be used for shifting the same transmission without a change in the transmission casing or in the gearing thereof, one of the shifting mechanisms being useful for manual shifting and the other for power shifting. With the manual shift lever 90 being utilized, a greater force for the same force exerted on the upper end of the lever 90 may be exerted on the first and second speed shift rail 59 than on the other shift rails due to the fact that the shift rail 59 is closer to the ball and socket joint of the lever 90 and the casing 13, and the transmission may thus be more easily downshifted into either first or second speed ratios from a higher speed ratio. The shift arrangement including the lever 90 is furthermore very compact since the three shift rails 59, 60 and 58 are all at the side of the gearing in the transmission rather than being located above the gearing.

We wish it to be understood that our invention is not to be limited to the specific constructions and arrangements shown and described except only insofar as the claims may be so limited, as it will be apparent to those skilled in the art that changes may be made without departing from the principles of the invention.

We claim:

1. In transmission mechanism, the combination of input and output shafts, gearing to drive said output shaft from said input shaft at a low and a high speed ratio, friction clutch means serving to complete said low speed ratio and friction clutch means serving to complete said high speed ratio, a first reciprocable member effective upon movement thereof for actuating said first named friction clutch to complete said low speed ratio and a second reciprocable member effective upon movement thereof for actuating said second named friction clutch to complete said high speed ratio, and a pivoted shifting lever adapted to selectively engage either of said members for moving the members, a greater force being required for actuating said first named friction clutch to complete said low speed ratio than is required for actuating said second named friction clutch to complete said high speed ratio, said first reciprocable member being located closer to the pivot of said pivoted shifting lever than is said high speed reciprocable member whereby the effective length of lever arm for said first reciprocable member is less than the effective length of lever arm for said second reciprocable member such that equal shifting forces applied to the pivoted shifting lever result in a greater force being applied for actuating said first named friction clutch than for actuating said second named friction clutch.

2. In transmission mechanism, the combination of input and output shafts, gearing to drive said output shaft from said input shaft at a low speed ratio and a high speed ratio, a positive clutch for completing said low speed ratio and a positive clutch for completing said high speed ratio, friction clutch means for synchronizing the engageable parts of said first named positive clutch and friction clutch means for synchronizing the engageable parts of said second named positive clutch, a greater force being required for operating said first named friction clutch for synchronizing the engageable parts of said first named positive clutch than is required for operating said second named friction clutch for synchronizing the engageable parts of said second named positive clutch, a reciprocable member shiftably movable to actuate said low speed positive and friction clutch means and a reciprocable member shiftably movable to actuate said high speed positive and friction clutch means, and a pivoted shifting lever adapted to selectively engage either of said members for shifting the member, said low speed reciprocable member being located closer to the pivot of said lever than is said high speed reciprocable member whereby the effective length of lever arm for said low speed reciprocable member is less than the effective length of lever arm for said high speed reciprocable member such that equal shifting forces applied to the pivoted shifting lever result in a greater force being applied for operating said first named friction clutch than for operating said second named friction clutch.

3. In transmission mechanism, the combination of input and output shafts, gearing to drive said output shaft from said input shaft at a low speed ratio and a high speed ratio, positive clutches for completing each of said speed ratios, a blocking and synchronizing ring for each of said positive clutches for blocking full engagement of the engageable parts of the clutch prior to synchronization of the said parts and including friction clutch means for synchronizing said parts prior to the engagement thereof, a reciprocable member shiftably movable to actuate said low ratio positive clutch and a reciprocable member shiftably movable to actuate said high ratio positive clutch, a greater shifting force being required for operating the friction clutch means for the positive clutch for completing the low speed ratio than is required for operating the friction clutch means for the positive clutch for completing the high speed ratio, and a pivoted shifting lever adapted to selectively engage either of said members for shifting the members, said low speed reciprocable member being located closer to the pivot of said lever than is said high speed reciprocable member whereby the effective length of lever arm for said low speed reciprocable member is less than the effective length of lever arm for said high speed reciprocable member such that equal shifting forces applied to the pivoted shifting lever result in a greater force being applied for actuating the friction clutch means for the positive clutch for completing the low speed ratio than for actuating the friction clutch means for the positive clutch for completing the high speed ratio.

4. In a transmission, the combination of a transmission casing, input and output shafts in said casing and extending longitudinally thereof, gearing to drive said output shaft from said input shaft at a plurality of driving ratios, three reciprocable shift rails for activating said gearing to produce said ratios, said rails being reciprocably disposed in said casing at different levels at one side of said gearing, and a shift lever pivoted in the transmission casing above said shift rails, said rails each being provided with a slot adapted to receive said lever and said lever when moved transversely of the transmission into three different positions being adapted to enter the slot in one of said rails in each of its said positions, said lever having a return bent upwardly extending tang portion adapted to engage said slots in two of said rails.

5. In a transmission, the combination of a transmission casing, input and output shafts in said casing and extending longitudinally thereof, gearing to drive said output shaft from said input shaft at a plurality of driving ratios, three shift rails reciprocably disposed in said casing for activating said gearing to produce said ratios, said rails being disposed at different levels at one side of the gearing, and a shift lever pivoted in the transmission casing above said rails, each of said rails being provided with a slot for receiving said lever and the lever when moved transversely of the transmission casing to three different positions engaging the slot in one of said rails in each of its said positions, the uppermost of said shift rails being engaged by an uppermost portion of said shift lever below its said pivot, said intermediate shift rail being provided with a downwardly extending portion in which its said slot is formed, said lever having a return bent upwardly extending tang portion adapted to enter and pass through said last named slot and adapted on a transverse movement of said lever to enter the slot in the lowermost of said rails.

6. In a transmission, the combination of a transmission casing, input and output shafts in said casing and extending longitudinally thereof, gearing to drive said output shaft from said input shaft at a plurality of driving ratios, three shift rails reciprocably disposed in said casing for activating said gearing to produce said ratios, said rails being disposed at different levels in a portion of a circle at one side of said gearing, and a shift lever pivoted in the transmission casing above the shift rails, each of said rails having a slot to receive said shift lever and said lever when moved transversely of the transmission casing into three different positions being adapted to enter the slot of one of said rails in each of its said positions, the uppermost of said shift rails being engaged by an uppermost portion of said shift lever below its said pivot, the intermediate one of said rails having a downwardly extending portion formed with the slot for the rail, said lever having a return bent upwardly extending tang portion for entering the slot of said intermediate rail and for passing therethrough and for also entering the slot in the lowest of said rails when the lever is moved transversely of said casing.

7. In combination, a transmission casing, a transmission disposed within said casing and including an axially shiftable member mounted for reciprocable movement within the casing, means on said casing providing a pivotal mounting for a shift lever of the swinging type designed for cooperation with said shiftable member, means providing a pair of journals in said casing in a different horizontal plane from said first-mentioned means providing a mounting for an alternatively usable shift lever of the sliding and oscillating type and likewise designed for cooperation with said shiftable member, and means defining a slot in said shiftable member disposed in spaced relation within the casing with respect to the journals and pivotal mounting whereby the means defining the slot may receive an end of either shift lever when the same is employed for shifting purposes.

8. In combination, a transmission casing, a transmission disposed within said casing and including a plurality of axially shiftable members mounted for reciprocable movement in respective planes within the casing, means on said casing providing a pivotal mounting for a shift lever of the swinging type for selective cooperation with said shiftable members, means defining a pair of journals in said casing in a different horizontal plane from said first-mentioned means for reception of an alternatively usable shift lever of the sliding and oscillating type and likewise designed for cooperation with said shiftable members, and means defining a slot in one of said members disposed in spaced relation within the casing with respect to the journals and the pivotal mounting for selectively receiving a part on the swinging shift lever spaced from its pivotal mounting or an end of the slidable and oscillatable lever when the same is employed for shifting purposes, there being a slot in another of said shiftable members adapted to receive therein an end of the swinging lever when the latter is employed for shifting purposes, and there being a second slot in said latter shiftable member adapted to receive therein an end of the sliding and oscillating lever when it is employed for shifting purposes.

9. In combination, a transmission casing, a transmission disposed within said casing and including an axially shiftable member mounted for reciprocable movement within the casing, means on said casing providing a pivotal mounting for a shift lever of the swinging type designed for cooperation with said shiftable member, means defining a pair of journals in said casing in a different horizontal plane from said first-mentioned means for reception of an alternatively usable shift lever of the sliding and oscillating type and likewise designed for cooperation with said shiftable member, said shiftable member including means defining a single slot therein disposed in spaced relation within the casing with respect to the journals and the pivotal mounting for receiving an end of the swinging shift lever when the latter is employed for shifting purposes or for receiving an end of the sliding and oscillating shift lever when the latter is employed for shifting purposes.

10. In a control means for controlling a transmission of the type having positive clutches movable to different positions to complete different speed ratios between input and output shafts wherein one of the positive clutches is movable to either of two engaged positions for completing one of two low speed ratios in each position thereof and another of the positive clutches is movable to either of two engaged positions for completing one of two high speed ratios in each position thereof and each of the positive clutches has friction clutch means associated therewith for synchronizing the speed of the engaging parts of each of the positive clutches as it is moved toward either of its engaged positions, the combination of a reciprocable member for first actuating the friction clutch means associated with the low speed positive clutch to synchronize the speed of the engaging parts and then actuating the low speed positive clutch, a reciprocable member for first actuating the friction clutch means associated with the high speed positive clutch to synchronize the speed of the engaging parts and then actuating the high speed positive clutch, and a pivoted shifting lever adapted to selectively engage either of said reciprocable members for moving them to either of their engaged positions, a greater force being required for actuating the friction clutch means associated with the positive clutch for completing the low speed ratios than is required for actuating the friction clutch means associated with the positive clutch for completing the high speed ratios, said low speed reciprocable member being located closer to the pivot of said shifting lever than is said high speed reciprocable member whereby the effective length of lever arm for said low speed reciprocable member is less than the effective length of lever arm for said high speed reciprocable member such that equal shifting forces applied to the pivoted shifting lever result in a greater force being applied for actuating the friction clutch means associated with the positive clutch for completing the low speed ratios than for actuating the friction clutch means associated with the positive clutch for completing the high speed ratios.

11. In a control means for controlling a transmission of the type having gearing and positive clutches movable to different positions to complete different speed ratios between input and output shafts wherein one of the positive clutches is movable to either of two engaged positions for completing one of two low speed power trains in each position thereof and another of the positive clutches is movable to either of two engaged positions for completing one of two high speed gear trains in each position thereof and each positive clutch has friction synchronizer rings associated therewith having blocker teeth thereon for preventing engagement of the engaging parts of the positive clutches prior to synchronization thereof, the combination of a reciprocable member for first actuating the synchronizing rings associated with the low speed positive clutch to synchronize the engaging parts and then actuating the low speed positive clutch, a reciprocable member for first actuating the synchronizer rings associated with the high speed positive clutch to synchronize the engaging parts and then actuating the high speed positive clutch, and a pivoted shifting lever adapted to engage either of said reciprocable members for shifting the members, a greater force being required to actuate the synchronizer ring associated with the positive clutch for completing the low speed ratios than is required for actuating the synchronizer ring associated with the positive clutch for completing the high speed ratios, said low speed reciprocable member being located closer to the pivot of said lever than is said high speed reciprocable member whereby the effective length of lever arm for said low speed reciprocable member is less than the effective length of lever arm for said high speed reciprocable member such that equal shifting forces applied to the pivoted shifting lever result in a greater force being applied to the synchronizer ring associated with the positive clutch for completing the low speed ratios than is applied to the synchronizer ring associated with the positive clutch for completing the high speed ratios.

12. In transmission mechanism adapted to be shifted by means of an upwardly extending shift lever movable in two substantially perpendicular planes or by means of a reciprocable and oscillatable shift rod adapted to extend substantially at right angles to the shift lever, the combination of a drive shaft, a driven shaft, a transmission housing through which said shafts extend, gearing in said housing for providing drives of two different speed ratios between said shafts, means for changing from one of the said drives to the other and including a longitudinal movable shift rail mounted in said housing and movable in one direction for completing one of the speed ratios and movable in the opposite direction for completing the other speed ratio, said rail having a slot therein, means providing a journal located generally above the said shift rail for pivotally mounting the upwardly extending shift lever so that by movement in one direction it can be moved into said slot and subsequent movement of it in a plane perpendicular to its first movement will shift said shift rail, and means providing journals in the sides of said housing for receiving the reciprocable and oscillatable shift rod so that it may be moved into said slot on rocking movement thereof and subsequent longitudinal movement thereof will cause longitudinal movement of said shift rail.

13. In transmission mechanism adapted to be shifted by means of an upwardly extending shift lever movable in two substantially perpendicular planes or by means of a reciprocable and oscillatable shift rod adapted to extend substantially at right angles to the shift lever, the combination of a drive shaft, a driven shaft, a transmission housing through which said shafts extend, gearing in said housing for providing drives of a plurality of different speed ratios between said shafts, means for changing from one of said drives to the other and including a pair of longitudinally movable shift rails mounted in said housing, each of said shift rails being movable in different directions to complete two of said different speed ratios, the first of said rails having a single slot therein, the second of said rails having a pair of slots therein, means providing a journal located generally above said shift rails for pivotally mounting the upwardly extending shift lever so that by movement of it in one direction into said single slot in said first rail and subsequent movement of it in a plane perpendicular to its first movement will shift said first shift rail and so that by movement of said shift lever in a direction opposite to the first direction and into one of said slots in said second rail and subsequent movement of it in a plane perpendicular to the last named direction will shift said second shift rail, and means providing journals in the sides of said housing for receiving the reciprocable and oscillatable shift rod so that it may be moved into the single slot of said first shift rail on rocking movement thereof and subsequent longitudinal movement thereof will cause longitudinal movement of said first shift rail and so that said reciprocable and oscillatable shift rod may be moved into the other of said slots in said second rail on rocking movement thereof and subsequent longitudinal movement thereof will cause longitudinal movement of said second shift rail.

JOHN M. SIMPSON.
DONALD W. KELBEL.

REFERENCES CITED

The following references are of record in the file of this patent:

UNITED STATES PATENTS

| Number | Name | Date |
|---|---|---|
| 1,395,019 | Turnbull | Oct. 25, 1921 |
| 1,820,006 | Beringer | Aug. 25, 1931 |
| 1,875,386 | MacKenzie | Sept. 6, 1932 |
| 1,956,528 | Fishburn et al. | Apr. 24, 1934 |
| 1,970,729 | Beringer | Aug. 21, 1934 |
| 1,997,448 | Birkemeier | Apr. 9, 1935 |
| 2,014,905 | Martinuzzi | Sept. 17, 1935 |
| 2,022,618 | Church | Nov. 26, 1935 |
| 2,030,838 | Hill | Feb. 11, 1936 |
| 2,057,073 | Vandervoort | Oct. 13, 1936 |
| 2,106,841 | Griswold | Feb. 1, 1938 |
| 2,115,089 | Tenney | Apr. 26, 1938 |
| 2,163,741 | Weaver | June 27, 1939 |
| 2,167,065 | Eckert | July 25, 1939 |
| 2,217,728 | Burt | Oct. 15, 1940 |
| 2,222,913 | Pescara | Nov. 26, 1940 |
| 2,277,913 | Kesling | Mar. 31, 1942 |
| 2,316,503 | Curtis | Apr. 13, 1943 |
| 2,323,384 | Eberhard | July 6, 1943 |
| 2,342,105 | Jacobi | Feb. 22, 1944 |
| 2,342,985 | Tyken | Feb. 29, 1944 |
| 2,356,522 | Kummich | Aug. 22, 1944 |
| 2,368,868 | Orr | Feb. 6, 1945 |
| 2,372,733 | Orr | Apr. 3, 1945 |
| 2,391,783 | Jacobi | Dec. 25, 1945 |
| 2,416,640 | Pinardi | Feb. 25, 1947 |
| 2,433,003 | Swennes | Dec. 23, 1947 |